United States Patent [19]

Shaw

[11] 4,015,435
[45] Apr. 5, 1977

[54] MARINE PIPELAYING APPARATUS

[75] Inventor: Clarence W. Shaw, Metairie, La.

[73] Assignee: J. Ray McDermott & Co., Inc., New Orleans, La.

[22] Filed: Jan. 30, 1975

[21] Appl. No.: 545,526

[52] U.S. Cl. .................................. 61/108; 61/105
[51] Int. Cl.² ........................................ B63B 35/04
[58] Field of Search ................ 61/72.3, 72.1, 72.4, 61/72.2, 72.5; 114/16, 16.8

[56] References Cited

UNITED STATES PATENTS

| | | | |
|---|---|---|---|
| 3,273,346 | 9/1966 | Delaruelle et al. | 61/72.3 |
| 3,321,925 | 5/1967 | Shaw | 61/72.3 |
| 3,487,648 | 6/1970 | Lawrence | 61/72.3 |
| 3,507,126 | 4/1970 | Rochelle et al. | 61/72.3 |
| 3,566,609 | 3/1971 | Smith | 61/72.3 |
| 3,765,185 | 10/1973 | Peck et al. | 61/72.3 |
| 3,822,558 | 7/1974 | Blankenship | 61/72.3 X |

Primary Examiner—Dennis L. Taylor
Attorney, Agent, or Firm—Arnold, White & Durkee

[57] ABSTRACT

A marine pipelaying apparatus for supporting pipeline during undersea pipelaying operations from a vessel floating on the surface of a body of water. The apparatus includes a tapering and longitudinally extending pipeline support member secured at one end to the vessel in a cantilevered manner and extending into the water. The pipeline support member includes a plurality of demountable sections decreasing in diameter and having sufficient buoyancy to float. The support member is designed to bend as it supports the pipeline being laid providing a desired profile without exceeding the elastic limit of the pipe. A hydraulic clamp for releasably clamping the pipeline support member is mounted on the vessel to secure the pipeline support member in a fixed relation to the vessel. A plurality of variable buoyancy floats and roller cradle mechanisms for buoyantly and slidably supporting a section of pipeline are attached above the pipeline support member. The apparatus can impart a stabilizing force to the pipeline and create a uniform stress distribution along the pipeline being laid which is within its elastic limit.

11 Claims, 9 Drawing Figures

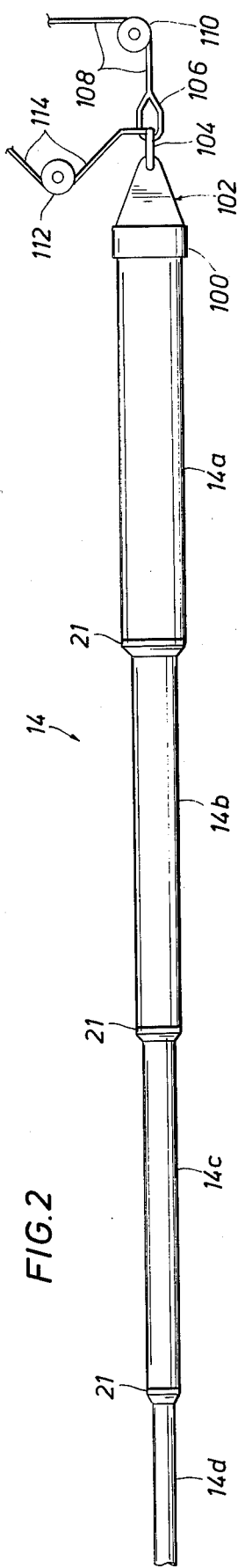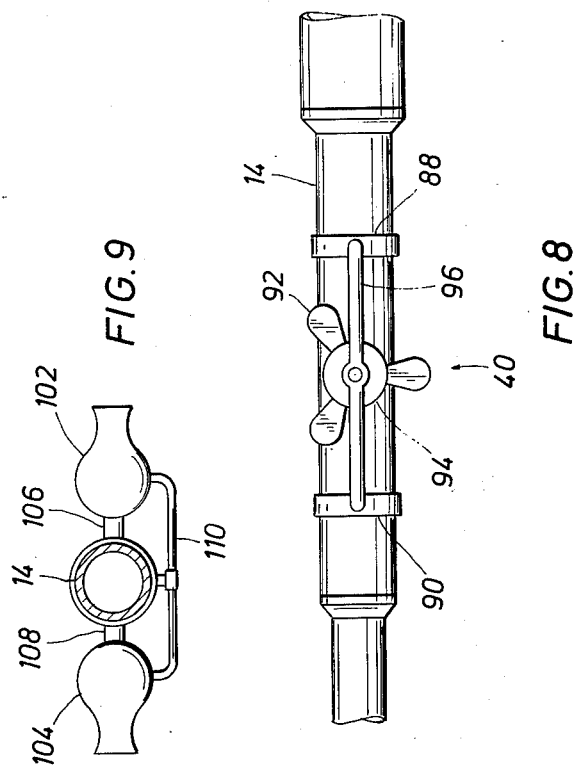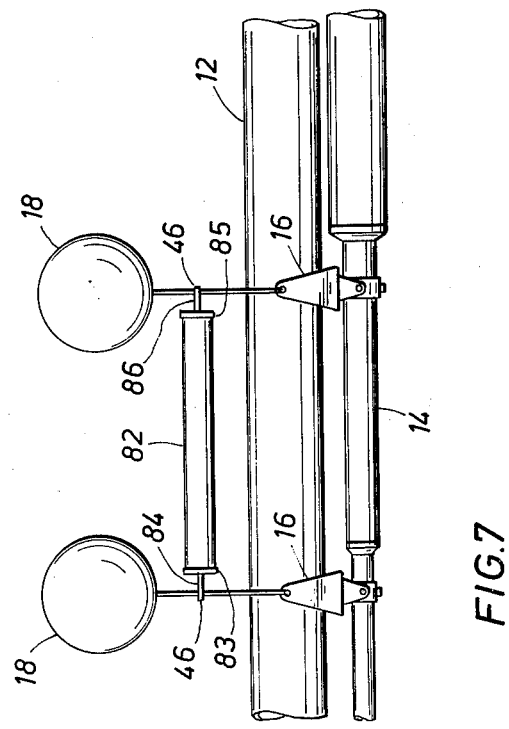

MARINE PIPELAYING APPARATUS

BACKGROUND OF THE INVENTION

This invention relates to marine apparatus for supporting within its elastic limit elongate pipe or the like during underwater pipelaying operations in which the pipe is laid from a surface vessel onto a submerged surface.

Current trends of offshore oil and gas procurement indicate that the drilling and working of underwater mineral deposits will be increasingly important in providing the world's energy requirements. Pipelines are often laid underwater to connect offshore oil and gas wells with a production platform or with a gathering station which may be located on a platform some distance away. Also, pipelines may be utilized to connect offshore oil and gas wells to an onshore production center. In such a situation, the wellhead assembly is positioned on the ocean floor over the well and the production pipeline runs from the wellhead assembly along the ocean floor to the onshore facilities.

Pipelaying operations are generally conducted with a pipelaying barge on which a continuous pipeline is assembled by joining together, as by welding, several lengths of pipe until a pipeline the necessary length has been assembled. The lowering of such a pipeline into the water from an assembly barge under tension results in some bending of the pipe. The amount of bending that takes place in the pipe varies considerably and depends upon the weight, the diameter, wall thickness and coating thickness of the pipe, the material of the pipe, and the depth of the water. In performing the underwater pipelaying operation, it is important that the elastic limit of the pipe not be exceeded. If the radius of curvature of the pipe is too small, the pipe may become overstressed and permanently damaged. When a bend is too short, as may happen in very deep water, the elastic limit of the pipe might be exceeded so that the pipe becomes kinked and deformed.

In order to prevent damage to the pipe being laid, it has been necessary to resort to a partially submerged rigid ramp or stinger underlying the pipe in its path to the submerged surface to support the pipe in an acceptable profile to prevent damage. Originally, rigid support ramps were designed to operate in relatively shallow water with the lower end resting on the submerged surface upon which the pipeline was to be laid. In pipelaying operations in which deeper water was encountered, the ramp was found to be unsatisfactory due to stability problems. The stabilizing effect of pipe tension was found to be very helpful and improved the ramp technique of pipelaying. The application of tension to the launched pipe string prevented undue curvature thereof in the suspended portion between the barge and the submerged surface thereby limiting pipe stress.

As pipelaying operations moved into yet deeper water, longer rigid ramps were used but were found to be self destructive. The long rigid ramps were next cut into sections and hinged for articulation. The articulated ramp along with pipe string tension improved deep water pipelaying as buoyancy was given to the overbend portion of the profile tending to relieve stress on the pipe string. A typical arrangement of an articulated ramp in combination with pipe tension means is described in U.S. Pat. No. 3,321,925, issued to Clarence W. Shaw and assigned to J. Ray McDermott and Co., Inc., the assignor and assignee of this application. Articulated ramps have been pivotally connected to the lay barge. Such a pivoted, articulated ramp is that described in U.S. Pat. No. 3,390,532, issued to Joseph B. Lawrence. With the freedom to flex at the articulated ramp joints and at the pivotal connection to the barge, the articulated ramp configuration tends to be unstable in the water and subject to great movement. The permissibility of such flexure negates some of the advantage gained through the articulation of the ramp.

In pipelaying operations which are being conducted in deep water, which may be several hundred feet deep, a great length of pipeline is held suspended between the submerged surface and the lay barge. The suspended length of pipe can act as a pendulum, and small forces acting upon the suspended pipe can cause large oscillatory motions. Therefore, even small currents creating force against the suspended pipeline can produce a great torque at the sections of pipe near the lay barge. Such torque may, of course, effect a stress in the pipe which exceeds the elastic limit of the pipe.

The articulated ramps in use today have an additional drawback in that typically they must be assembled prior to delivery to the job site. The ordeal of transporting such a large, unseaworthy structure can be both tedious and expensive.

Another problem with articulated ramp structure is that the hydraulic jacks used to rigidify the ramp are subject to damage and consequent failure. This occurs because forces acting about a hinge connection, which include the upwardly acting forces exerted by the buoyancy of the adjacent support member and the downwardly acting forces exerted by the weight of the pipe, may get out of balance giving rise to a resultant force. The resultant force can be of such a great magnitude as to exert a torque about the hinge that exceeds the jack capacity. Jack failure may permit adjacent members to assume an unsuitable relative inclination causing damage to the adjacent section of pipe.

SUMMARY OF THE INVENTION

There is accordingly provided by the instant invention a novel design for marine pipelaying apparatus of the type which utilizes a supportive structure for the pipeline to be laid depending from a surface vessel, which design permits bending of the pipeline to a desired profile and, yet, minimizes the problem of excessive stress in the pipe without the necessity of having articulation of the supportive member to thereby increase the stability of the pipe string being supported.

There is also provided by the instant invention a novel design for marine pipelaying apparatus of the type which utilizes a supportive structure for the pipeline to be laid wherein the structure may be stored and transported on the surface vessel until assembly is required which can be at the job site and on the surface vessel.

There is further provided by this invention a novel pipelaying apparatus which allows a wide range of pipe sizes to be laid while providing a suitable pipeline profile by using a novel supportive structure which is tapered and cantilevered.

There is also provided by this invention a novel pipelaying apparatus which enables stable pipelaying operations to be conducted in a body of water, in which there are large undersea currents, by using a lateral thruster beneath the water surface to produce a force to resist the water current.

The novel marine pipelaying apparatus of this invention comprises a tapering cantilevered pipeline support member secured to and extending from the rear of the surface vessel; means for releasably clamping the pipeline support member in a fixed relation to the surface vessel; means for rendering the pipeline slidably moveable above and along said pipeline support member; and a plurality of variable buoyancy float means providing buoyancy forces to balance pipeline weight.

The pipeline support member extending from the rear of the surface vessel bends as it supports the pipeline being laid in a suitable profile as to prevent overstressing the pipeline. The releasable clamp holds the support member in cantilever in a fixed position relative to the surface vessel to provide added stability to the pipe string. The plurality of longitudinally spaced, variable buoyancy float means provide flotation to help support the pipe string in the proper profile. The roller means also allows the pipeline to slide down the bending support member to the submerged surface where it is to be laid.

These and other features will become apparent from the attached drawings, the detailed disclosure and appended claims which follow.

BRIEF DESCRIPTION OF THE DRAWINGS

FIG. 2 is a view of one embodiment of the pipeline support member.

FIG. 3 is a view of an alternate embodiment of the pipeline support member.

FIG. 7 is a side elevation view of the pipeline and the supportive structure with flotation and including enlongated rigid float members.

FIG. 8 is a side view of the supportive structure for the pipeline including a lateral thruster.

FIG. 9 is a cross-section of the pipeline support structure and an alternate lateral thruster.

DETAILED DESCRIPTION OF THE INVENTION

General Summary

Figure 1:
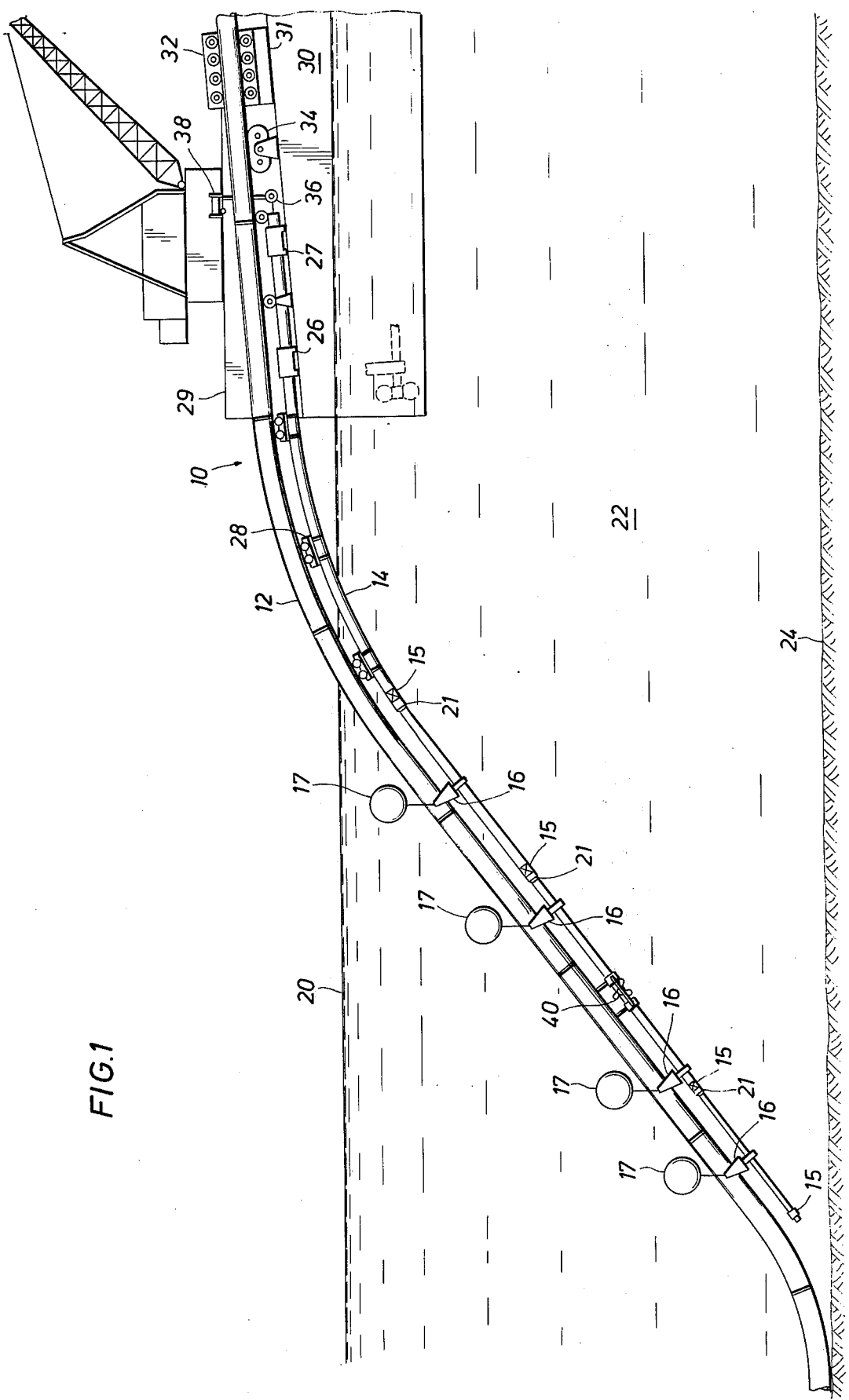
FIG. 1 is a simplified side elevation view of a marine apparatus for supporting flexible elongate pipe utilizing a vessel floating at the surface of a body of water.

Referring to FIG. 1, there is shown a preferred embodiment of the invention in conjunction with a buoyant vehicle, barge 30, floating on the surface 20 of a body of water 22 above submerged surface 24. Barge 30 has a ramp 31 from which the marine pipelaying apparatus 10 of the present invention depends. Ramp 31 slopes downwardly and rearwardly to a position only slightly above the water level. In some cases, however, the rear end of ramp 31 may be underwater. Barge 30 will, of course, be loaded with supplies, pipe sections, fuel and the like.

The preferred embodiment of the present invention shown in FIG. 1 includes a tapering support member 14 adapted to underlie and support flexible elongate pipe or the like during the underwater laying thereof from barge 30 onto submerged surface 24. Support member 14 is releasably clamped to barge 30 in a fixed relation thereto. Support member 14 extends downwardly and rearwardly to a point adjacent but spaced above submerged surface 24.

Support member 14 is held in cantilever by hydraulically operated clamping mechanisms 26 and 27. Clamping mechanisms 26 and 27 can be a hydraulic grip clutch having, for example, four jaws which engage support member 14. Clamping mechanisms 26 and 27 are able to accommodate varying pipe diameters. Clamping mechanisms 26 and 27 are securely attached to ramp 31 of barge 30 to hold support member 14 in a fixed position with respect to barge 30.

Barge 30 is provided with roller support and guide means 34 mounted on ramp 31 ahead of clamping mechanism 27. Guide means 34 is aligned with support member 14 to properly position pipeline 12 for supportive entry into the water. Guide means 34 may be rollers arranged to cradle pipeline 12 permitting movement downwardly and rearwardly on ramp 31 as barge 30 moves forward.

A restraining means 32 is mounted on deck 29 of barge 30 and engages pipeline 12 providing resistance to relative movement between the continuous pipeline 12 and barge 30. Restraining means 32 is positioned forward of guide means 34. Such restraining means as contemplated herein may be that which is described in U.S. Pat. No. 3,321,925 to C. W. Shaw, assigned to the assignee of this application.

In order to vary the length of support member 14 extending beyond the rear of barge 30, there is provided extension and retraction means 36. Extension and retraction means 36 is shown mounted on the side of barge 30 forward of the clamped end of support member 14. After clamp mechanism 26 and 27 are released, extension and retraction means 36 can be operated to draw support member 14 forwardly or to force the same rearwardly. Extension and retraction means 36 operates by winch 38 operating on a cable which connects to support member 14.

To render support member 14 more positively buoyant and to create an upward force to counteract the vertical load of pipeline 12, buoyant float means 17 are attached in a spaced, longitudinal manner along support member 14 as shown. Float means 17 and roller assembly means 16 buoyantly and slidably support a section of pipeline 12 above support member 14 and thus reduce the bending moments thereon by maintaining a long radius of curvature for pipeline 12.

There is also shown protruding from support member 14 a lateral thruster 40 which serves to stabilize support member 14 and pipeline 12. The thrust created by lateral thruster 40 acts in a direction opposite to the force created by underwater currents impinging support member 14.

In a particular feature of the preferred embodiment of the invention, the vertical acting buoyancy forces of float means 17 may be separately adjusted so that the support member 14 buoyancy forces may be generally balanced with the pipeline forces acting downwardly. By selective spacing or sizing of the various float means 17, support member 14 may be selectively controlled in such a manner as to maintain itself and pipeline 12 in the desired configuration for particular pipe negative buoyancy, pipe size, and water depth.

As another additional feature of the preferred embodiment, water pressure sensitive transducer means 15 produces a signal which is functionally related to the depth in body of water 22 of the respective support member section 14a, 14b, 14c, or 14d. Operators on barge 30 are thereby provided with an indication of the distribution of the pipeline 12 on support member 14. An indication of support member 14 profile may also be derived from the depth information. The availability of such indication may be used to initiate any necessary corrective change in support member 14 attitude in the water to a more desirable configuration.

Support Member Structure

Referring to FIG. 2, there is one configuration of support member 14. Support member 14 in this configuration includes a plurality of demountable sections indentified as 14a, 14b, 14c and 14d in the referenced drawing. Each of the sections possesses sufficient buoyancy to float. Used in the preferred embodiment of the present invention, support member 14 as shown could have sections which are each approximately 60 feet in length. Section 14a would be the portion of support member 14 which would be clamped by hydraulic clamp mechanisms 26 and 27. Section 14a could be, for example, 10¾ inch pipe. Section 14b could be 8⅝ incl. pipe. Section 14c could be 6 inch pipe. Section 14d could be 4 inch pipe. The progression of large to small pipe diameters gives support member 14 a tapered appearance overall. The sections 14a–14d would be coupled together by screw joints 21. It is to be understood, however, that the size of the pipe sections may be varied as different sizes of pipeline are to be laid. Being sectional, support member 14 has a great many advantages in handling and storage as it can be barge shipped, assembled on the lay barge and launched with the pipestring.

An alternate support member configuration to that of FIG. 2 is shown in FIG. 3. There is shown in FIG. 3 a one-piece tapered member 14'. As with support member 14 of FIG. 2, one-piece member 14' is clamped about its larger end 23. One-piece member 14' could have a diameter on the order of 10–12 inches at larger end 23 decreasing to a diameter of 3–5 inches at smaller end 25.

Referring to FIG. 2 and FIG. 3, support member 14 and one-piece member 14' both have a cap 100 on the end of pipe section 14a and larger end 23 respectively. An apertured ear 102 is affixed to cap 100. A ring 104 is fitted into apertured ear 102, and ring 104 receives cable 114 and connector 106 which is in turn secured to cable 108. Cables 114 and 108 extend from ring 104 over idler pulleys 112 and 110 respectively. Cables 114 and 108 then connect to a take-up drum on winch 38 as shown in FIG. 1. The foregoing apparatus in combination with winch 38 comprise extension and retraction means 36. It will be obvious that, upon release of hydraulic clamping mechanisms 26 and 27, the winch 38 may be operated to draw support member 14 forwardly or to urge the same rearwardly and thus permit the addition of pipe sections to support member 14 or the removal of some pipe sections therefrom.

Support member 14 (FIG. 2) and one-piece support member 14' (FIG. 3) could be made of steel having a higher tensile and elastic limit than pipe string 12 which is being supported. Support member 14 will assume any pipe string configuration and serves to equalize stress along the pipe string as it imparts a stabilizing force to the pipe string 12.

Structure for Slidably Supporting Pipeline

Figure 4:
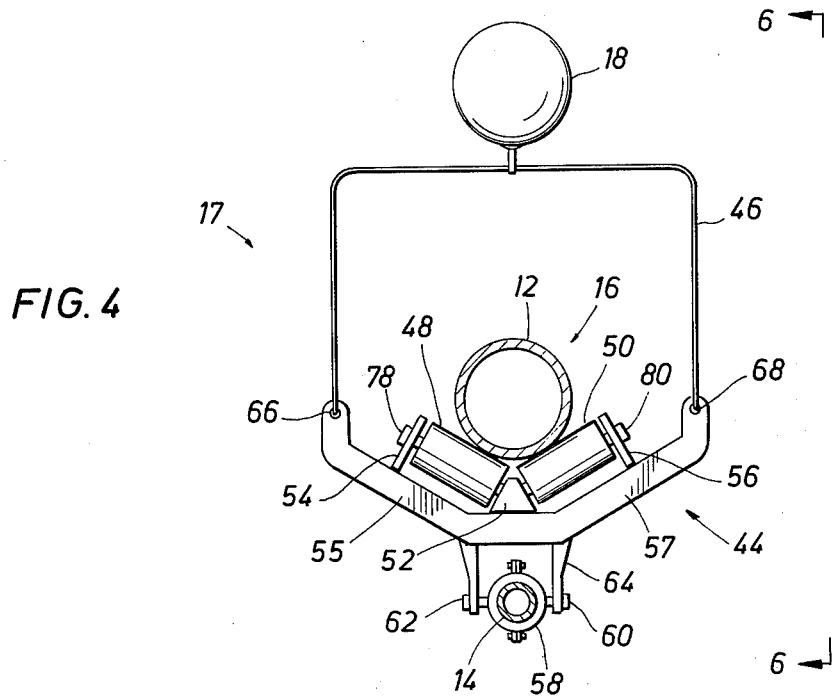
FIG. 4 is a cross-sectional view of the pipeline and the supportive structure including flotation.

The structure for slidably supporting pipeline 12 attaches to float means 17 and comprises the plurality of roller assembly means 16 carried by support member 14. Details of roller assembly means 16 may be had by referring to FIG. 4 and FIG. 6. In FIG. 4, there is illustrated in general a cross-sectional view of float means 17 and roller assembly means 16. Included in this drawing are support member 14, pipeline 12, roller assembly means 16, and float 18.

Roller assembly means 16 includes two cylindrical rollers 48 and 50 which are contiguous with the underside of pipeline 12 giving support thereto. Rollers 48 and 50 are rotatably mounted on pin shafts 78 and 80 respectively. A v-shaped frame 44 has brackets 54 and 56 extending perpendicularly from cradle arms 55 and 57. Frame 44 also has a triangular shaped holder 52 at the base of the arms 55 and 57. Pin shafts 78 and 80 are carried by brackets 54 and 56 along with holder 52. Frame 44 therefore supports rollers 48 and 58, but it does so such that they are in an inclined position forming a cradle for pipeline 12.

Figure 6:
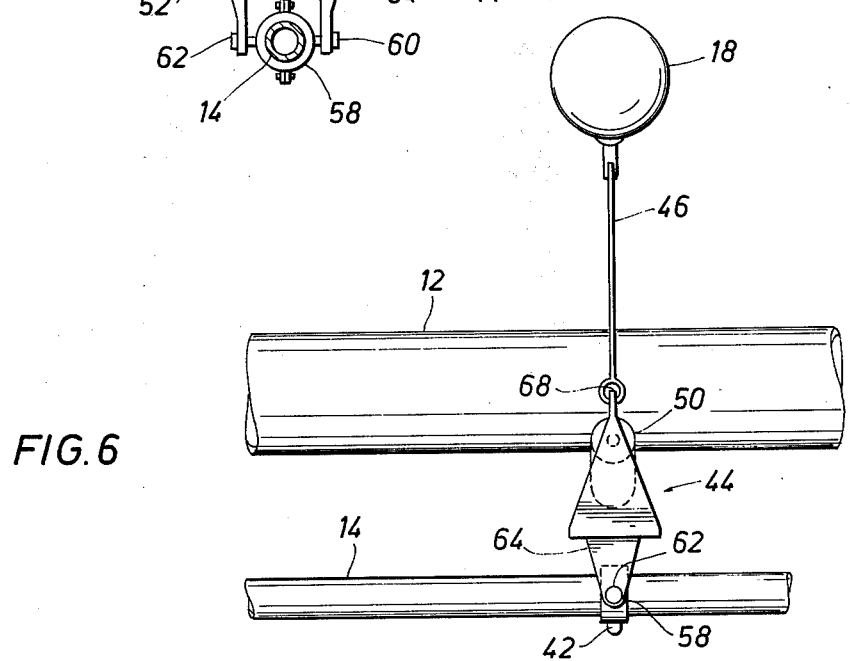
FIG. 6 is a view of a portion of the pipeline and the supportive structure therefore including flotation.

With further reference to FIGS. 4 and 6, frame 44 has a mounting bracket 64 attached to its underside. Bracket 64 has a conventional, selectively releasable clamp 58 journalled thereon by journals 60 and 62. Clamp 58 securely engages the periphery of support member 14 to couple roller assembly means 16 and float means 17 to support member 14 preventing sliding movement of float means 17. The releasable clamp 58 permits the position of float means 17 to be changed along the length of support member 14.

As will be appreciated, when pipeline 12 is supported on roller assembly means 16, frame 44 will pivot freely about journals 60 and 62 so as to provide optimum, automatically conforming engagement between rollers 48 and 50 and the underside of pipeline 12.

With the pipeline supporting arrangement above described, the plurality of roller assembly means 16 slidably support pipeline 12 such that its longitudinal axis is uniformly curved and inclined downwardly.

The Flotation System

Figure 5:
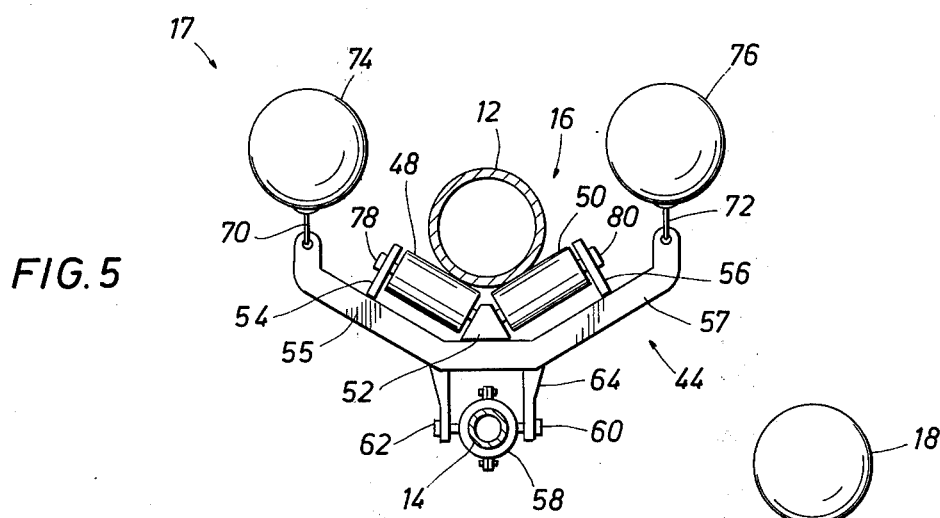
FIG. 5 is a cross-sectional view of the pipeline and support structure including another flotation arrangement.

Primary flotation necessary to create buoyancy forces acting upwardly which partially balances the negative buoyancy of pipeline 12 is supplied by floats 18. Floats 18 are a part of float means 17 as illustrated in FIGS. 4 and 5. The buoyancy forces acting along support member 14 can be varied by moving the float means 17 to preselected positions on support member 14. Further adjustment of buoyancy forces can be made by extending or retracting support member 14 placing more or less of the structure in the water.

Floats 18 are attached to roller assembly 16 by interconnecting means 46 as shown in FIG. 4. Interconnecting means 46 is an inverted U-shaped hanger which has its ends 66 and 68 disposed within arms 55 and 57 respectively of frame 44. Float 18 is positioned directly above pipeline 12 by this arrangement such that the buoyancy force created by it will act through the cross-sectional center of pipeline 12. This arrangement prevents lateral tipping of float means 17 which could cause pipeline 12 to be dislodged from its cradled position.

An alternate form of float arrangement and attachment is shown in FIG. 5. There is illustrated dual floats 74 and 76 which are connected to frame 44 by attachment rods 70 and 72 respectively. Each float, 74 and 76, produces an upwardly acting buoyancy force which together equal the downward pipeline forces. The forces created by bags 74 and 76 tend to create a torque about support member 4. The torque created by bag 74 opposes the torque created by bag 76. In order to prevent tipping, the torque produced by each float must be equal. Therefore, floats 74 and 76 must provide equal buoyancy.

As the laying operation is continued while maintaining desired tension on pipeline 12 with restraining means 32, float means 17 may be added or removed as the depth of the body of water 22 increases or decreases so as to maintain he desired profile of supported pipeline 12.

Additional flotation may also be provided by rigid elongated float members as viewed in FIG. 7. Elongated float member 82 is generally cylindrical and closed by end caps 83 and 85. To the end caps 83 and 85, there are connected attachment brackets 84 and 86 respectively which securely affixed elongated float member 82 to interconnecting means 46 of float means 17. Elongated float member 82 can be of a buoyancy value suitable for the characteristics of the pipe being laid. Attachment of elongated float means 82 is such that it is positioned above the center of gravity of the support member 14 and pipe string 12 in order to effect the desired relation between the center of buoyancy and the center of gravity.

Remote Profile and Load Indication

In order to provide the operators on barge 30 with a remote indication of the profile of support member 14, pressure-responsive transducer means 15 (FIG. 1) are attached longitudinally thereto. The transducers 15 produce a signal responsive to the water pressure of the location depth at which they are positioned. The pressure reading of each transducer is converted to a depth indication. The depth readings enable the determination of support member 14 and pipeline 12 profile. The various transducers 15 are connected by cables to signal responsive indication equipment positioned aboard barge 30.

Additional remote indication of pipeline 12 position is provided by pressure plates (not shown) adjacent the rollers of roller assembly means 16. The pressure plate contacts a load-responsive pressure transducer (not shown) connected by suitable means to a signal responsive load indicator positioned aboard barge 30.

During laying operations, if pipeline 12 becomes laterally decentralized, it will move into contact with the pressure plates causing the load transducer to output a signal indicative of the change in lateral position. An operator will be alerted that the pipe is becoming asymmetrically distributed laterally.

Lateral Thruster

Referring to FIG. 8, there is shown, secured to support member 14, lateral thruster 40. Lateral thruster 40 comprises a reversible drive means 94, a propellor 92 and mount 96. Drive means 94 may be a hydraulic, electric or compressed air motor. Propellor 92 is connected to the shaft of drive means 94 and is turned at selected different speeds. Mount 96 includes clamps 88 and 90 and serves to couple support member 14 and drive means 94 together. Propellor 92 is driven to produce thrust which will resist the force created by undersea currents. Lateral thruster 40 will stabilize support member 14 and pipeline 12 as it compensates for the torque created about releasable clamps 26 and 27 by supplying a torque in the opposite direction.

Referring to FIG. 9, there is shown internal combustion engines which are an alternative lateral thruster to the driven propellor. Internal combustion engines 102 and 104 are secured to support member 14 by mounts 106 and 108. Fuel is supplied to the engines by fuel line 110 which extends to barge 30. Oxygen and ignition lines (now shown) would also be supplied to the engines. Internal combustion engines 102 and 104 provide a lateral force to counteract water currents.

While a single specific embodiment of the invention has been shown and described herein, it is to be understood that the same is merely illustrative of the principles involved and that other embodiments may be employed within the scope of the present invention, as defined by the appended claims.

What is claimed is:

1. A marine pipelaying apparatus for laying pipeling on a submerged surface in a body of deep water from a vessel floating on the surface of the body of water and adapted to be transported between different locations on board the surface vessel and launched therefrom, comprising:

a bendable, non-articulated pipeline support member, self-supporting over its entire length, secured to and extending from the rear of the surface vessel into water for supporting the pipeline in a profile that is within the elastic limit of the pipe, said pipeline support member having a tapered configuration wherein the upper portion of the support member secured to the surface vessel is of a larger cross section than is the unsecured lower end, and comprising a plurality of interconnected co-axial sections that may be disassembled for loading on the surface vessel and assembled for launching of the support member from the surface vessel;

means for releasably clamping said pipeline support member in a fixed relation to the surface vessel;

means for rendering the pipeline slidably movable above and along said pipeline support member; and a plurality of variable buoyancy float means providng buoyancy forces to reduce pipeline negative buoyancy to balance pipeline weight.

2. The marine pipelaying apparatus of claim 1, wherein said float means are adjustable to permit selective spacing along said pipeline support member.

3. The marine pipelaying apparatus of claim 2, further comprising:

guage means for determining water pressure at each of said support member sections and converting the reading to depth below the water surface thereby providing a profile reading of the pipeline support member.

4. The marine pipelaying apparatus of claim 1, further comprising:

means for extending and retracting said pipeline support member to alter the unsupported length of the pipeline support member depending off the surface vessel.

5. The marine pipelaying apparatus of claim 1, wherein said variable buoyancy float means comprises:

a metal float; and means for interconnecting said metal float with said means for slidably moving the pipeline.

6. The marine pipelaying apparatus of claim 5, wherein said means for rendering the pipeline slidably moveable is a roller cradle means.

7. The marine pipelaying apparatus of claim 6, wherein said means for interconnecting the float and the roller cradle means is an inverted U-shaped hanger extending above said roller cradle means and pivotally connected thereto.

8. The marine pipelaying apparatus of claim 6, wherein said roller cradle means is a V-shaped member having rollers affixed therein and having a mounting bracket secured to the apex for attachment to said pipeline support member.

9. The marine pipelaying apparatus of claim 1, further comprising:

means mounted to said pipeline support member at a location beneath the water surface, for applying a force to said support member in a direction and with a magnitude sufficient to resist water current acting upon said pipeline support member.

10. The marine pipelaying apparatus of claim 9, wherein said means for applying a force is a lateral thrust internal combustion engine.

11. The marine pipelaying apparatus of claim 1, further comprising:

elongated, rigid float members attached to said pipeline support member to effect a desired relation between the center of buoyancy and the center of gravity of said pipeline support member; and said float members disposed above the center of gravity of said pipeline support member.

* * * * *

UNITED STATES PATENT OFFICE
CERTIFICATE OF CORRECTION

Patent No. 4,015,435   Dated April 5, 1977

Inventor(s) Clarence W. Shaw

It is certified that error appears in the above-identified patent and that said Letters Patent are hereby corrected as shown below:

Column 4, line 34, change "mechanism" to --mechanisms--.

Column 7, line 5, change "4" to --14--.

Column 7, line 14, change "he" to --the--.

Column 7, line 21, change "affixed" to --affixes--.

Signed and Sealed this

Twenty-eighth Day of June 1977

[SEAL]

Attest:

RUTH C. MASON
Attesting Officer

C. MARSHALL DANN
Commissioner of Patents and Trademarks